Sept. 20, 1966   J. H. CLARK   3,273,578
CRASH CLOSED SHUT-OFF VALVE
Filed Aug. 9, 1962   2 Sheets-Sheet 1

INVENTOR.
JOHN H. CLARK
BY George F. Westerman
ATTORNEY

Sept. 20, 1966  J. H. CLARK  3,273,578
CRASH CLOSED SHUT-OFF VALVE
Filed Aug. 9, 1962  2 Sheets-Sheet 2

INVENTOR.
JOHN H. CLARK
BY George F. Waterman
ATTORNEY

United States Patent Office 3,273,578
Patented Sept. 20, 1966

1

3,273,578
CRASH CLOSED SHUT-OFF VALVE
John H. Clark, Indianapolis, Ind., assignor to the United States of America as represented by the Secretary of the Army
Filed Aug. 9, 1962, Ser. No. 216,004
8 Claims. (Cl. 137—68)

The invention described herein may be manufactured and used by or for the Government for governmental purposes without the payment to me of any royalty thereon.

This invention relates to the field of safety valves, more particularly to safety valves designed to close automatically when the fluid containers or conduits with which they are associated are subjected to unusual displacement.

In situations where a container or conduit holding a flammable or other dangerous fluid is exposed to unusual displacement, for example when the containers or conduits are located in an aircraft, boat, or vehicle which may, of course, be involved in an accident, it is desirable to provide means to prevent the escape of the fluid from the containers or conduits. It is especially important in aircraft to limit the escape of the fuel should the aircraft crash. In a crash, forces may be generated which tend to move the fuel cells or conduits in any conceivable direction with respect to each other. Various methods have been proposed and utilized for making the fuel cells themselves crash resistant. To minimize fire hazard it is also desirable that means be provided to seal all outlet and vent openings in the fuel cells and to trap any substantial quantity of fuel which can be isolated in a conduit or other part of the fuel system.

It is an object of this invention to provide novel and improved crash closed shut-off valves to be used in a fluid supply system to seal off the fluid containers, conduits and other components of the system in the event of a crash or collision.

Another object of the invention is to provide new and improved crash closed shut-off valves for use in the fuel system of an aircraft.

Basically the crash closed shut-off valve of the present invention comprises a valve body adapted to be mounted at an opening in a fluid container or at another critical point in a fluid supply system; a valve proper slidable within the valve body between a normal open position and a valve closing position; and, an actuating cable connecting the valve proper with another component of the fluid system or with some part of the supporting structure, said actuating cable including a frangible link. In the event of a crash causing relative displacement of the components of the fluid system the valve proper is pulled by the actuating cable from its normal open position to its valve closing position. After the valve is closed the frangible link in the actuating cable breaks. In its preferred form the valve body of the present invention has a cylindrical bore and the valve proper consists of a piston slidable within said bore. Means are provided for locking the piston in its normal open position so that it cannot be accidently jarred shut and means are provided for locking the piston in its valve closing position. The valve may be used alone or it may be paired with a similar valve, the pistons of the two valves being joined by actuating cables and a frangible link.

The nature of the invention, its various embodiments, the possible modifications which can be made thereto and the advantages thereof will be developed in the following description and in the drawings in which.

Figure 1:
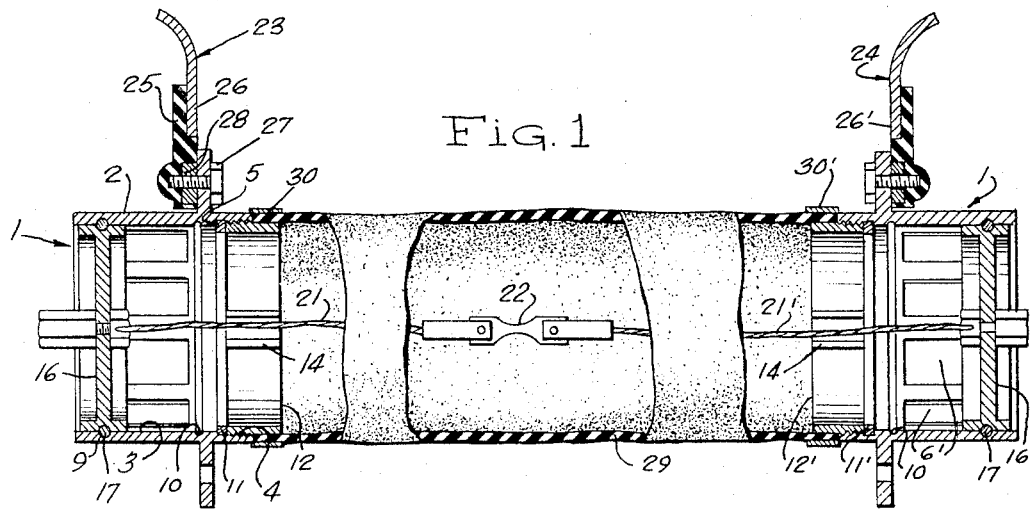
FIG. 1 shows a pair of crash closed shut-off valves of the preferred embodiment used with an interconnector connecting two aircraft fuel cells. The components are shown in section and the two valves are in their normal open position.
Figure 2:
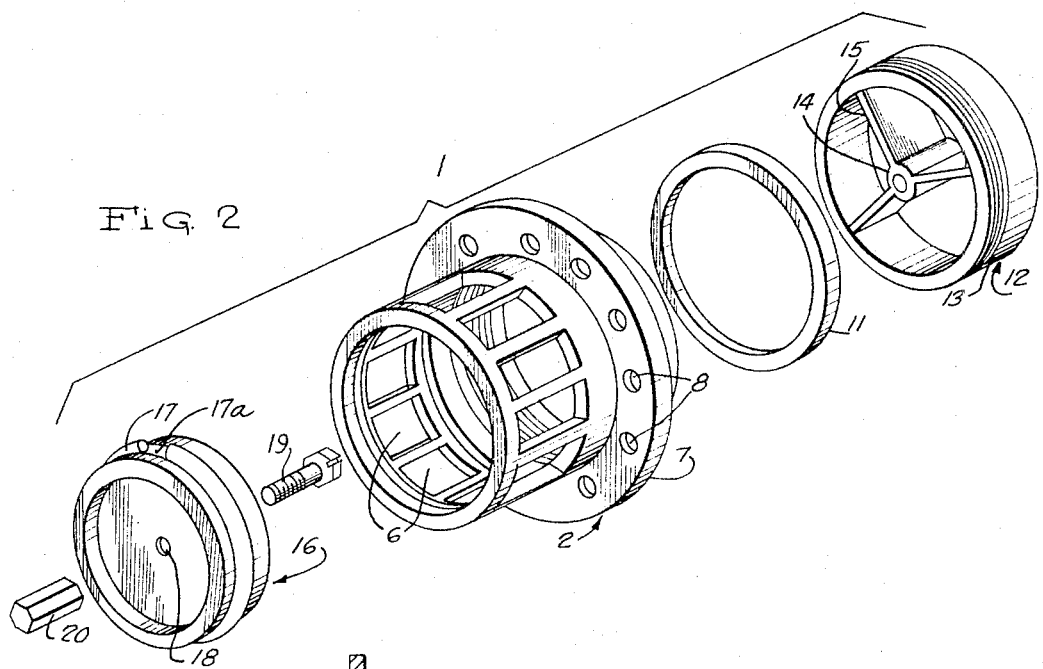
FIG. 2 is an exploded view showing the components of one of the shut-off valves illustrated in FIG. 1.
Figure 3:
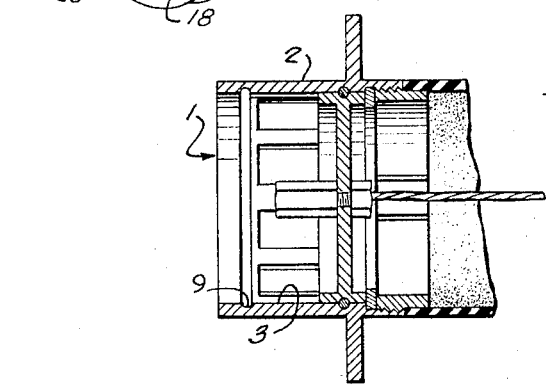
FIG. 3 is a sectional view of one of the valves of FIG. 1 in its closed position.

Referring to FIGS. 1, 2, and 3, the shut-off valve 1 in its preferred form comprises a generally cylindrical valve body 2 having an axial bore 3. Bore 3 is of larger diameter and is threaded at end 4 which is exterior the fuel cell. Annular face 5 is formed at the point where the diameter of axial bore 3 changes. A plurality of fuel ports 6 permit the passage of fuel from the interior of fuel cell 23 to the interior of valve 2. An annular mounting flange 7 having a plurality of threaded bolt holes 8 encircles and is part of valve body 2. Annular locking grooves 9 and 10 are formed in axial bore 3 at the locations indicated. The characteristics and function of these grooves will be clarified hereinafter. Ring-shaped flexible valve seat 11 is positioned within valve body 2 against annular face 5. It is held in place by spider bushing 12 which has threads 13 adapted to be screwed into threaded end 4 of valve body 2. Spider bushing 12 which is essentially a hollow cylinder includes cable guide tube 14 centered and supported by web members 15.

The valve proper which serves to open and shut off valve 1 is a valve piston 16 which is slidably mounted within axial bore 3 of the valve body. Valve piston 16 has an annular groove 17a which receives resilient expandible lock ring 17. Lock ring 17 coacts with locking groove 9 to retain valve piston 16 in a valve open position with the valve piston substantially clear of fuel ports 6. The lock ring also coacts with locking groove 10 to hold valve piston 16 in a valve closed position obstructing the passage of liquid between end 4 of valve body 2 and fuel ports 6. Annular groove 10 is so situated that when valve piston 16 is locked in its closed position flexible seat 11 is somewhat compressed by the valve piston forming a tight, substantially leak proof seal. Valve piston 16 has a hole 18 to accommodate cable anchor bolt 19. Cable anchor bolt 19 is secured to valve piston 16 by nut 20 and serves to connect the valve actuating means to the valve piston. The valve actuating means includes actuating cable 21 and frangible actuating link 22 which are connected to each other and to cable anchor bolt 19.

In FIG. 1 a pair of shut-off valves 1 and 1' are shown in a typical installation. Valve 1' is identical to valve 1. The two shut-off valves are part of an interconnector assembly linking aircraft fuel cell 23 with aircraft fuel cell 24. Aircraft fuel cell 23 which may be made of any crash resistant material, such as rubber-impregnated nylon fabric, has a circular opening defined by cell flange 25. The cell flange may be formed integrally with cell wall 26 or may be affixed thereto. Cell flange 25 has imbedded in it a plurality of threaded nuts 28 at locations corresponding to bolt holes 8 of mounting flange 7 of shut-off valve 1. Flange bolts 27 are screwed through threaded holes 8 and into nuts 28 causing a tight seal to be made between mounting flange 7 and cell flange 25. Shut-off valve 1' is similarly mounted on fuel cell 24.

When shut-off valves 1 and 1' have been mounted on their respective fuel cells the fuel ports 6 and 6' are within the cells. Actuating cables 21 and 21' pass through cable guide tubes 14 and 14' of the spider bushings of valves 1 and 1' and are connected to each other by frangible actuating link 22. The actuating mechanism is disposed within flexible hose connector 29. The flexible hose connector which serves as a fluid conduit during normal operation is slipped over spider bushings 12 and 12' of valves 1 and 1' and is removably attached thereto by hose connector clamps 30 and 30'.

In the event an aircraft equipped with the fuel cell interconnector shut-off system shown in FIG. 1 crashes, the shut-off system functions as follows. Relative movement of fuel cells 23 and 24 which might eventually rupture hose connector 29 causes tension in actuator cables 21 and 21'. The force thereby exerted on valve pistons 16 and 16' causes lock rings 17 and 17' to be compressed so that the pistons are free to move toward each other into valve closing positions against flexible valve seats 11 and 11' respectively. Lock rings 17 and 17' then expand into annular grooves 10 and 10'. The two valve pistons compress the flexible valve seats until frangible actuating link 22 fails at which time the flexible valve seats expand forcing each valve piston rearward until its lock ring shoulders against annular grooves 10 or 10' as the case may be. At this point flexible valve seats 11 and 11' are still somewhat compressed so that a tight seal is maintained with the related valve pistons. After the failure of frangible actuating link 22 continued relative movement of the two fuel cells causes the failure of flexible hose connector 29. However, inasmuch as valves 1 and 1' are closed before the flexible hose connector breaks no substantial quantity of fuel is spilled.

From the foregoing it is clear that the components of the crash closed shut-off valve itself and the related structure with which it is used, such as the interconnector system shown in FIG. 1, must have certain characteristics. The fuel cell or other element of a fuel system with which a shut-off valve is used must be sufficiently strong so that it does not itself fail. Thus the mounting means (mounting flange 7, cell flange 25, bolts 27, and nuts 28) must be so designed that the mounting means will not tear away from cell wall 26 or otherwise fail. Lock ring 17 and annular groove 9 must be so related to each other that the valve piston will remain in its locked open position under all conditions except during a crash and that only crash induced tension of cable 21 will move it from its locked open to its locked closed position. The tension on actuating cable 21 which causes lock ring 17 to compress, permitting valve piston 16 to close, must obviously be substantially less than that which will cause frangible actuating link 22 to fail. A lock ring designed with a minimum lock open strength of approximately 20% of the strength of the actuating link will perform satisfactorily. The strength factor of the lock ring 17 may be controlled in a number of ways familiar to those skilled in the art such as through proper selection of spring wire material for the lock ring and by varying the lock ring diameter, the depth of annular groove 9, and the relief angle on the pullout side of annular grove 9. Beryllium copper wire is a satisfactory material for the lock ring. A flexible valve seat 11 made of neoprene material having a durometer hardness of 40 will perform quite adequately. The cable guide tube 14 should be made of a hard material which will not be scored by cable 21. This is important because during a crash cable 21 may be bent over the edge of guide tube 14 and it must slide freely over that edge if the mechanism is to function properly. Frangible link 22 in addition to being strong enough to transmit sufficient tension to cable 21 to close valve piston 16 should be substantially weaker than flexible hose connector 29 so that it fails before hose 29 tears.

Figure 4:
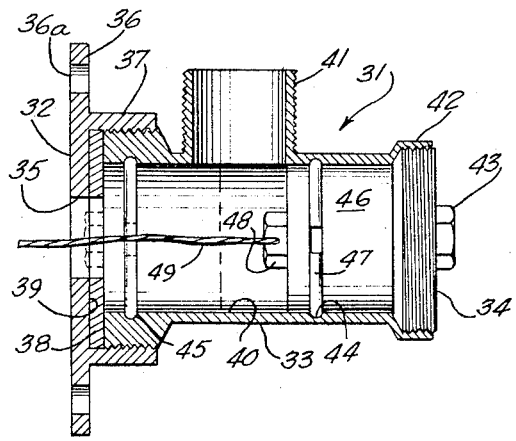
FIG. 4 is a cross sectional view of another embodiment of the crash closed shut-off valve indicating in solid lines the location of the piston during the valve open position and in dotted lines the location of the piston during the valve closed position.
Figure 5:
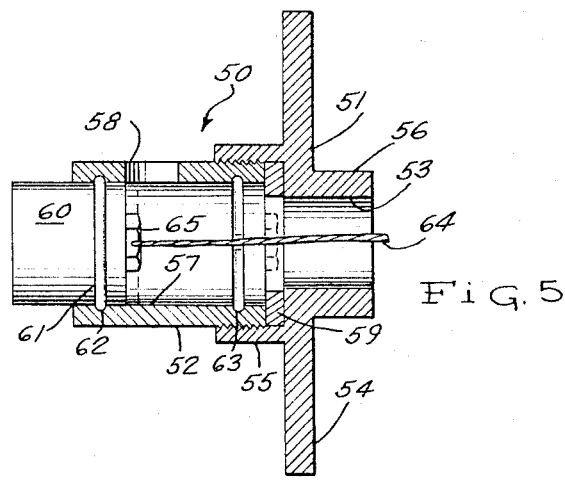
FIG. 5 is a sectional view of another embodiment of the crash closed shut-off valve illustrating the open and closed positions of the valves in the same manner as FIG 4.

FIGS. 4 and 5 illustrate two other embodiments of the crash closed shut-off valve. These designs are especially suitable for installations requiring smaller valves than those shown in FIGS. 1, 2, and 3. The shut-off valve shown in FIGS. 4 and 5, for instance, might be used with ½ inch conduits while the shut-off valve shown in FIGS. 1, 2, and 3 might be used with a 3 inch conduit. The shut-off valve shown in FIG. 4 could be used on the discharge side of a fuel pump, while that shown in FIG. 5 could be used for a small fuel cell interconnector or at the vent of a fuel cell.

The shut-off valve of FIG. 4 includes a valve body 31 composed of 3 separable members, a valve base 32, a valve cylinder 33 and a cylinder plug 34. Valve base 32 is formed with an axial port 35, an attachment flange portion 36, and a cylindrical barrel portion 37 perpendicular to the circular attachment portion 36. A plurality of holes 36a are drilled in the attachment flange portion 36 and are used in affixing the valve to another component of a fuel system. The interior of barrel portion 37 is threaded.

Annular-shaped flexible valve seat 38 is received in barrel portion 37 and fits tightly against face 39 of valve base 32. Flexible valve seat 38 is held in place by valve cylinder 33 which is adapted to be screwed into cylindrical barrel portion 37 of the valve base. Valve cylinder 33 includes an axial bore 40, a transverse nipple 41 communicating with said axial bore and an internally threaded portion 42 adapted to receive end plug 34. Threaded end plug 34 includes an integral bolt head 43 which may be used for installing and removing the end plug. Annular locking grooves 44 and 45 are cut into the wall of axial bore 40. Valve piston 46 which is circular in cross section is slidably received in axial bore 40; the surface of the valve piston is grooved to receive resilient lock ring 47. Cable anchor bolt 48 is screwed into the front face of valve piston 46. Actuating cable 49 of an actuating mechanism which includes a frangible actuating link similar to that shown in FIG. 1 is attached to cable anchor bolt 48 and passes through axial port 35.

The several elements of the shut-off valve of FIG. 4 are thus so constructed and arranged that valve piston 46 is held in its normal open position clear of the opening in nipple 41 by the cooperation of lock ring 47 and annular groove 44. In case of a crash the tension exerted on actuating cable 49 is sufficient to cause lock ring 47 to compress and valve piston 46 to slide within axial bore 40 to the valve closed position indicated by dotted lines in FIG. 4. In the closed position, valve piston 46 is seated tightly against flexible valve seat 38 and locked in place by the coaction of lock ring 47 and annular groove 45. Flow of fluid between axial port 35 and nipple 41 is cut off by valve piston 46.

The valve body 50 of the shut-off valve shown in FIG. 5 comprises a valve base 51 and valve cylinder 52. The valve base 51 has an axial port 53, a circular attachment portion 54 and cylindrical barrel portion 55 whose structure and function are similar to those of the corresponding parts of valve base 32 in FIG. 4. Additionally, valve base 51 has a nipple portion 56 adapted to be slipped into a flexible connector or other conduit. A clamp (not shown) may then be used to secure the flexible connector or conduit onto nipple portion 56. Valve cylinder 52 has an axial bore 57 and a lateral port 58 communicating with said axial bore. The valve cylinder is threaded at one end and is screwed into barrel portion 55 of the valve base where it is seated against annular-shaped flexible valve seat 59. Valve piston 60 which is grooved and carries lock ring 61 in said groove is slidably received in axial bore 57. Annular grooves 62 and 63 cut in the walls of axial bore 57 coact with lock ring 61 to secure valve piston 60 in its locked open and locked shut positions respectively. The location of the valve piston in its locked open position is shown in solid lines in FIG. 5; its location in the locked closed position is indicated by dotted lines. The valve is closed during a crash by tension transmitted through a frangible actuating link (not shown) and actuating cable 64 to cable anchor bolt 65 which is screwed into valve piston 60.

From the foregoing description it should be apparent that the crash closed shut-off valve may be modified in many respects without departing from the spirit of the invention. Other mounting means besides flanges and bolts may be used to secure the valve in place. The internal cavity of the valve body need not be an axial bore circular in cross section. Any convenient cross section might be used. Correspondingly the valve proper need not be a cylindrical piston. Thus a square cross section or other shape might be used for the valve piston. Such a change would of course require different locking means to replace the lock ring illustrated. A spring loaded ball-type detent mounted either within the piston or within the valve body with a ball engaging socket in the other part could be used. Furthermore, the valve piston could be replaced by a plug-type valve whose outside diameter is substantially smaller than the inside diameter of the valve body. Such a plug valve would have a tapered face and could be pulled into sealing engagement with a correspondingly tapered flexible valve seat. The actuating means need not include a frangible actuating link if an actuating cable is chosen which will itself fail at a desired tension. The flexible hose connector 29 shown with the interconnector system of FIG. 1 may consist of a flexible tubular bellows containing two or more convolutes supported by wire rings in the tubular configuration.

The three valves and the interconnector system shown in the drawing were actually constructed and tested. The valves shown in FIGS. 1, 2, and 3 were made 3 inches in size and the valves shown in FIGS. 4 and 5 were made in ½ inch size. All valves and systems performed satisfactorily in dynamic tests involving load factors of about 35 G's.

Among the advantages inherent in the crash closed shut-off valves illustrated are that they may be attached to fuel cell fittings presently being manufactured, that they may be used on interconnected fuel cells spaced very closely together, that the pressure loss through each valve is negligible and that they minimize spillage of fuel during fuel line separation and minimize leakage thereafter. Thus the shut-off valves of the present invention are effective in reducing the danger of fire after the crash of an aircraft. As stated previously, this crash closed shut-off valve may also be used in other applications where it is important to minimize the spillage of inflammable or other dangerous liquids.

I claim:

1. A crash closed shut-off valve for use in a fluid system and actuated by displacement of components of that system comprising:
   (a) a valve body having a fluid passage therethrough;
   (b) a valve controlling fluid flow in the passage, disposed for movement along a longitudinal axis within said valve body between a normal valve open position and valve closed position;
   (c) releasable locking means coacting between said valve body and said valve to lock said valve in the valve open position until a predetermined tensile force acting along said longitudinal axis is exerted on said valve;
   (d) second locking means coacting between said valve body and said valve to lock said valve in the valve closed position in response to the movement of said valve from the valve open position to the valve closed position;
   (e) actuating cable means attached to said valve body and adapted to transmit tensile force to said valve body along said longitudinal axis and to break, without damage to the valve and fluid system, when said tensile force is substantially greater than that needed to move the said valve to the valve closed position.

2. A crash closed shut-off valve for use in an aircraft fuel supply system and actuated by displacement of components of that system comprising:
   (a) a valve body having an axial bore, an axial port at one end of said axial bore, and at least one lateral opening communicating with said axial bore;
   (b) a valve piston slidably mounted in said axial bore for movement between a normal valve open position and a valve closed position controlling fluid flow in the bore;
   (c) releasable locking means coacting between said valve body and said valve piston to lock said valve piston in the valve open position until a predetermined tensile force is exerted on said valve piston;
   (d) second locking means coacting between said valve body and said valve piston to lock said valve piston in said valve closed position in response to the movement of said piston from the valve open position to the valve closed position; and
   (e) actuating cable means attached to said valve piston adapted to transmit tensile force to said valve piston and to break, without damage to the valve and fuel system, when said tensile force is substantially greater than that needed to move the valve piston to the valve closed position.

3. A crash closed shut-off valve as described in claim 2:
   (a) wherein said releasable locking means comprises a resilient lock ring mounted on and encircling said valve piston and a first annular locking groove formed in the wall of said axial bore;
   (b) wherein said second locking means comprises the said resilient lock ring and a second annular locking groove formed in the wall of said axial bore; and
   (c) wherein said actuating cable means comprises an actuating cable connected to said valve piston and a frangible actuating link connected to said actuating cable.

4. A crash closed shut-off valve for use in an aircraft fuel cell comprising:
   (a) a generally cylindrical valve body having an axial bore, an intermediate, annular mounting flange adapted to affix said valve body in the wall of the fuel cell whereby the inner portion of said valve body extends into the fuel cell and the outer portion extends out from the fuel cell, at least one lateral port provided in said inner portion, and first and second annular locking grooves formed in said axial bore on opposite sides of said lateral port;
   (b) an annular, resilient valve seat mounted in said axial bore intermediate said second locking groove and the end of the outer portion of said valve body;
   (c) a valve piston for controlling fluid flow in said axial bore, having an annular lock ring receiving groove, said piston slidably received in said axial bore for movement between a normal valve open position wherein said lock ring receiving groove is aligned with said first locking groove and a valve closed position wherein said lock ring receiving groove is aligned with said scond locking groove;
   (d) a resilient, split lock ring seated in said lock ring receiving groove and coacting with said locking grooves for selectively locking said piston in said valve open and valve closed positions; and
   (e) actuating cable means, including a frangible link, attached to said valve piston and extending outwardly through said axial bore adapted to transmit crash induced tensile force to said piston thereby closing said valve and adapted thereafter to break.

5. A crash closed shut-off valve as described in claim 4 having a spider bushing threadedly mounted in the outer end of said axial bore abutting said resilient valve seat, and a centrally located cable guide tube.

6. A crash closed shut-off valve as described in claim 4:
   (a) wherein said valve body comprises a valve base having a barrel portion and a valve cylinder threadedly received in said barrel portion;
(b) wherein said resilient valve seat is received in the barrel portion of said valve base; and
(c) wherein said valve base includes said mounting flange, and said outer portion of said valve body.

7. A crash closed shut-off valve for use in an aircraft fuel supply system comprising:
(a) a valve base having an attachment flange portion, an axial port through said flange, and a cylindrical barrel portion intermediate said axial port and the outer perimeter of said flange;
(b) a resilient annular valve seat received in said barrel portion and abutting said flange;
(c) a valve cylinder threadedly received in said barrel portion having an axial bore, a removable end plug, a transverse nipple intermediate said barrel and said end plug, a first annular locking groove intermediate said nipple and said end plug, and a second annular locking groove intermediate said nipple and said valve seat;
(d) a valve piston for controlling fluid flow in said axial bore having an annular lock ring receiving groove, said piston slidably received in said axial bore for movement between a normal valve open position wherein said lock ring receiving groove is aligned with said first locking groove and a valve closed position wherein said lock ring receiving groove is aligned with said second locking groove;
(e) a resilient, split lock ring seated in said lock ring receiving groove and coacting with said locking grooves for selectively locking said piston in said valve open and valve closed positions; and
(f) actuating cable means, including a frangible link, attached to said valve piston and extending outwardly through said axial bore adapted to transmit crash induced tensile force to said piston thereby closing said valve and adapted thereafter to break.

8. Apparatus for interconnecting two crash resistant fuel cells in an aircraft adapted to prevent spillage of fuel in the event of displacement of the fuel cells relative to each other comprising:
(a) a pair of valve bodies mounted in adjacent walls of the two fuel cells, each body having a fluid passage therethrough;
(b) a flexible conduit communicating with each fluid passage, and interconnecting said valve bodies and adapted to rupture more readily than the fuel cells;
(c) a pull-type valve within each valve body controlling the fluid flow in said passage, said valve movable between a normal valve open position and a valve closed position;
(d) releasable resilient locking means coacting between each valve and its respective valve body to lock said valve in the valve open position;
(e) second resilient locking means coacting between each valve and its respective valve body, after each valve is closed to lock said valve in the valve closed position responsive to the movement of said valve from the valve open position to the valve closed position; and
(f) actuating cable means passing through said flexible conduit and interconnecting said valves adapted, in the event of fuel cell displacement, to close said valves and subsequently to break before said flexible conduit ruptures.

References Cited by the Examiner

UNITED STATES PATENTS 3,043,542 7/1962 Neuschotz _____ 137—68 X
3,072,149 1/1963 Hasbany _____ 251—297 X

FOREIGN PATENTS 978,686 11/1950 France.

WILLIAM F. O'DEA, *Primary Examiner.*

ISADOR WEIL, *Examiner.*

J. DEATON, R. GERARD, *Assistant Examiners.*